United States Patent
Anderson et al.

(10) Patent No.: US 9,506,582 B2
(45) Date of Patent: Nov. 29, 2016

(54) DROP IN LOOP HANGER

(71) Applicant: ERICO International Corporation, Solon, OH (US)

(72) Inventors: Scott E Anderson, Garrettsville, OH (US); Jeffrey A Wilson, Cuyahoga Falls, OH (US); Eric J Wilson, Solon, OH (US)

(73) Assignee: ERICO INTERNATIONAL CORPORATION, Solon, OH (US)

( * ) Notice: Subject to any disclaimer, the term of this patent is extended or adjusted under 35 U.S.C. 154(b) by 0 days.

(21) Appl. No.: 14/302,810

(22) Filed: Jun. 12, 2014

(65) Prior Publication Data

US 2014/0367527 A1    Dec. 18, 2014

Related U.S. Application Data

(60) Provisional application No. 61/834,461, filed on Jun. 13, 2013.

(51) Int. Cl.
*E21F 17/02* (2006.01)
*F16L 3/13* (2006.01)
*F16L 3/133* (2006.01)

(52) U.S. Cl.
CPC .............. *F16L 3/13* (2013.01); *F16L 3/133* (2013.01); *Y10T 29/49826* (2015.01)

(58) Field of Classification Search
CPC ......... F16L 3/13; F16L 3/133; F16L 3/1203; F16L 3/11; F16L 3/1058; F16L 3/1025; F16L 3/12; F16L 3/1075
USPC .................................................. 248/58, 60
See application file for complete search history.

(56) References Cited

U.S. PATENT DOCUMENTS

| | | | | |
|---|---|---|---|---|
| 1,320,828 A | * | 11/1919 | Bilbrough ............ | F16L 3/11 24/599.9 |
| 2,616,645 A | * | 11/1952 | Kindorf et al. ............ | 248/62 |
| 3,167,286 A | * | 1/1965 | Sherburne ............ | 248/62 |
| 3,191,899 A | * | 6/1965 | Kindorf ............ | F16L 3/11 248/62 |
| 4,019,705 A | * | 4/1977 | Habuda et al. ............ | 248/58 |

(Continued)

FOREIGN PATENT DOCUMENTS

| CA | 152665 S | 5/2014 |
|---|---|---|
| EP | 2112413 A1 | 10/2009 |

(Continued)

OTHER PUBLICATIONS

International Search Report and Written Opinion from corresponding International Application No. PCT/US2014/042071, mailed on Oct. 22, 2014.

*Primary Examiner* — Christopher E Garft
(74) *Attorney, Agent, or Firm* — Quarles & Brady LLP

(57) ABSTRACT

A drop-in loop hanger includes a U-shape portion or saddle for receiving an object to be supported, such as a pipe run, and an arm that guides the object to be supported into the U-shape portion. The hanger may include a moving portion that pivots at a hinge to allow entry of the object, then closes off the entryway to help retain the object within the hanger. The hanger may include a threaded portion for receiving a threaded rod, for example to mount the hanger from a ceiling or other structure or objects. The object may be placed in a series of already-installed hangers, for example placing a run of pipe in a series of hangers that support the pipe at different axial locations along the pipe.

16 Claims, 15 Drawing Sheets

(56) References Cited

U.S. PATENT DOCUMENTS

| | | | |
|---|---|---|---|
| 4,101,103 A * | 7/1978 | Mooney et al. ............... 248/58 |
| 6,003,852 A * | 12/1999 | Kawamura ...... H01B 13/01209 |
| | | | 269/287 |
| 6,164,604 A | 12/2000 | Cirino et al. |
| 6,959,898 B1 * | 11/2005 | Laughlin et al. ............... 248/60 |
| 7,140,585 B2 * | 11/2006 | Wakuta ........................ 248/306 |
| 7,210,658 B2 * | 5/2007 | Carrera ....................... 248/74.1 |
| 8,805,153 B2 * | 8/2014 | Rudenick ............ G02B 6/4471 |
| | | | 248/73 |
| 2006/0138286 A1 | 6/2006 | Connolly |
| 2009/0057498 A1 | 3/2009 | Oh et al. |
| 2015/0176726 A1 * | 6/2015 | Bacon ................... F16L 3/1215 |
| | | | 248/74.4 |

FOREIGN PATENT DOCUMENTS

| | | |
|---|---|---|
| WO | 8202239 A1 | 7/1982 |
| WO | 2014020294 A1 | 2/2014 |

\* cited by examiner

DROP IN LOOP HANGER

This application claims priority from U.S. Provisional Application 61/834,461, filed Jun. 13, 2013, which is incorporated by reference in its entirety.

BACKGROUND OF THE INVENTION

1. Field of the Invention

The invention is in the field of hangers and supports for objects such as pipes.

2. Description of the Related Art

Clamps for holding circular objects such as pipes or conduits are commonly used in a wide variety of circumstances, such as to secure the objects to structure, to secure other objects or fixtures to the circular objects, or to otherwise limit movement of the circular objects. One example is hanging pipes for a sprinkler system, or other types of pipe or conduit, from threaded rod to which a hanger is attached.

Hangers for pipes have been hung from structure to allow a service pipe or conduit to be slid through the hanger loop. Sprinkler pipe may be in sections that are 6.4 meters (21 feet) in length. The common practice for installing horizontal runs of such pipe is for an installer to hang the threaded rod and hangers in the ceiling structure first. This required the installer to stab (slide) the pipe sections through the hangers, moving the pipe horizontally into the already-installed hangers or disassembling hangers, wrapping the hanger around the pipe, and re-installing on to the threaded rod.

SUMMARY OF THE INVENTION

According to an aspect of the invention, a hanger that has a catch arm that, when the pipe or conduit is dropped onto it, guides the pipe or conduit into the hanger.

According to another aspect of the invention, a hanger has a fixed leg and a moving leg that together complete a loop.

According to yet another aspect of the invention, the hanger has a moving leg that the weight of the pipe or conduit will open, allowing the pipe or conduit to enter the hanger.

According to yet another aspect of the invention, the hanger has a moving leg that a downward force applied to the pipe or conduit will open, allowing the pipe or conduit to enter the hanger.

According to still another aspect of the invention, the moving leg of a pipe hanger closes automatically when the pipe or conduit is in the hanger.

According to yet another aspect of the invention, the leg and mating surface of a hanger connect together when in the closed position. This connection allows both sides of the hanger to distribute the hanging load.

According to other aspects of the invention, a hanger includes: a U-shape portion; and a catch arm that guides an object to be supported by the hanger into the U-shape portion. The hanger also may include one or more of the following features: the hanger has a fixed portion; the hanger has a moving portion; the fixed portion and the moving portion together make a loop; the fixed portion and the moving portion are mechanically couplable together to close the loop; the mechanical coupling between the fixed portion and moving portion is releasable; the connection between the moving portion and the fixed portion distributes loads to both sides of the hanger; when placing the object into the hanger, weight of the object opens the moving leg; the moving portion closes automatically when the object is in the hanger; the moving portion is hinged where it connects to other parts of the hanger; the U-shape portion is part of the moving portion; the U-shape portion is part of the fixed portion; the arm is part of the moving portion; the arm is part of the fixed portion; the arm is angled relative to the U-shape portion; the arm and the U-shape portion are parts of either the fixed portion or the moving portion; the arm is bent away from one side of the U-shape portion; the hanger includes a barrel nut; the barrel nut is configured to threadedly couple to a threaded rod; the barrel nut is connected to a top end of either the fixed portion; the moving portion moves relative to the fixed portion to open up a space between the catch arm and another part of the hanger, to allow opening of a loop and entry of the object into the U-shape portion; at least some parts of the hanger are made of steel; at least some parts of the hanger are stamped; and/or the object is a pipe or conduit.

According to an aspect of the invention, a hanger includes: a threaded rod coupling at a top end of the hanger; a saddle mechanically coupled to the coupling, for receiving an object to be supported by the hanger; and a catch arm, outside of the coupling and the saddle, that guides the object to be supported by the hanger into the saddle as the object is moved relative to the hanger.

In an embodiment of a hanger according to the previous paragraph, the hanger includes a tip between the saddle and the catch arm; and a stem between the saddle and the top end.

In an embodiment of a hanger according to any previous paragraph, the stem includes: a vertical stem portion; and an angled stem portion that extends from the vertical stem portion inward toward a centerline of the hanger, to the top end.

In an embodiment of a hanger according to any previous paragraph, the tip is vertical.

In an embodiment of a hanger according to any previous paragraph, the top end is horizontal.

In an embodiment of a hanger according to any previous paragraph, the top end is centered over a center of the saddle.

In an embodiment of a hanger according to any previous paragraph, the saddle is curved so as to accommodate a circular object as the object to be supported.

In an embodiment of a hanger according to any previous paragraph, the hanger includes a leg that is movable relative to the catch arm to selectively admit the object to be supported, and closes automatically once the object is in the hanger.

In an embodiment of a hanger according to any previous paragraph, the leg is hinged at a connection with the top end.

In an embodiment of a hanger according to any previous paragraph, the hanger includes a stem between the saddle and the top end; and the stem is hinged at a connection with the top end.

In an embodiment of a hanger according to any previous paragraph, the hanger includes a tip between the saddle and the catch arm; and a stem between the saddle and the top end; and the tip, the stem, and the saddle are all parts of a single continuous, unitary piece of material.

In an embodiment of a hanger according to any previous paragraph, the threaded rod coupling includes a barrel nut that is configured to threadedly couple to the threaded rod.

In an embodiment of a hanger according to any previous paragraph, the hanger includes a tip between the saddle and the catch arm; and there is an angle between the tip and the catch arm of between 120 and 150 degrees, to give one possible range.

In an embodiment of a hanger according to any previous paragraph, the saddle has a circular surface for receiving the object, with the circular surface having a radius; and the catch arm extends from a centerline of the hanger, between a center of the saddle and the threaded rod coupling, that is at least 100% of the radius.

In an embodiment of a hanger according to any previous paragraph, the movable leg includes one or more tabs that restrain movement of the object away from the saddle.

In an embodiment of a hanger according to any previous paragraph, the hanger includes a movable portion that moves relative to a fixed portion that includes the threaded rod coupling, to admit the object to the saddle, with the movable portion biased to close automatically after the object has been received in the saddle.

In an embodiment of a hanger according to any previous paragraph, the movable portion includes the saddle.

In an embodiment of a hanger according to any previous paragraph, the fixed portion includes the saddle.

According to another aspect of the invention, a method of installing an object to be supported includes the steps of: suspending a series of hangers from respective threaded rods; and moving the object onto catch arms of the hangers, which direct the object into the hangers and onto saddles of the hangers.

In an embodiment of a method according to the previous paragraph, the object is a horizontal run of pipe or conduit.

In an embodiment of a method according to any previous paragraph, the catch arms extend outwardly beyond the saddles of the hangers; and the moving includes vertically lowering the object onto the angled catch arms, which direct the object downwardly, and inwardly toward the saddles.

In an embodiment according to any previous paragraph, the catch arm(s) are angled catch arm(s).

In an embodiment of a method according to any previous paragraph, the suspending includes coupling threaded rod couplers of the hangers to the threaded rods; and the threaded rod couplers are in line with centers of the respective saddles.

In an embodiment of a method according to any previous paragraph, the lowering includes moving movable portions of the hangers relative to the threaded rods, with the moving portions returning to close off the hangers as the object clears the movable portions.

In an embodiment of a method according to any previous paragraph, the lowering directs the object to the saddles under the object's own weight.

According to a further aspect of the invention, a loop hanger includes: a fixed portion; and a moving portion that moves relative to the fixed portion, into an open position, to admit an object to be supported by the hanger, into the hanger. The moving portion is biased to return to a closed position after the object is admitted. The moving portion is in the closed position with the object admitted, the moving portion and the fixed portion together provide load paths for weight of the object, on opposite sides of the object.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily to scale, show various aspects of the invention.

DETAILED DESCRIPTION

Figure 1:
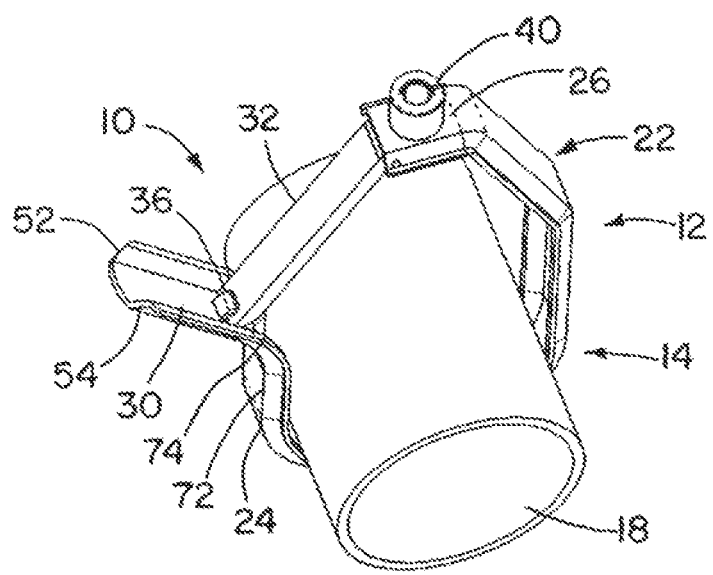
FIG. 1 is an oblique view of a hanger in accordance with an embodiment of the present invention.

A drop-in loop hanger includes a U-shape portion or saddle for receiving an object to be supported, such as a pipe run, and an arm that guides the object to be supported into the U-shape portion. The hanger may include a moving portion that pivots at a hinge to allow entry of the object, then closes off the entryway to help retain the object within the hanger. The hanger may include a threaded portion for receiving a threaded rod, for example to mount the hanger from a ceiling or other structure or objects. The object may be placed in a series of already-installed hangers, for example placing a run of pipe in a series of hangers that support the pipe at different axial locations along the pipe.

Standard definitions of some terms are as follows. A band hanger is a type of hanger that is adjustable and utilizes a band looped around the pipe. A clevis hanger is a type of split ring hanger. A hanger is a unit assembly used singly or in combination with other assemblies for supporting or hanging pipe. A ring is a pipe hanger that completely encircles a pipe without a positive gripping action. A solid clip ring is a ring that has to be slipped onto the end of the pipe and is not able to be opened in any way for attachment to the pipe after the pipe line is assembled. A split swivel ring is a ring that is capable of being opened so that the pipe is able to be put into the ring after the pipe line is assembled. A solid swivel ring is a solid ring that has a top swivel in which the hanger is able to be connected to a rod after it has been installed on the pipe.

A pipe-drop-in loop hanger is a hanger supported by a threaded rod. It is made up four different components; a barrel nut, a catch arm, a moving leg, and a loop portion with a fixed leg.

The main body of the pipe-drop-in loop hanger is a stamped loop with a fixed leg that wraps around the service pipe or conduit. The U-shape portion of the loop captures the pipe on the bottom and both sides. The preferred method of creating the U-shape component is stamping. However, other manufacturing processes may be used, such as casting, forging, or machining. The parts of the hanger may be made from any of a variety of suitable materials, an example being suitable steel.

One side of the U-shape portion is a-catch arm. This catch arm catches the pipe or conduit guiding the part into the U-shape portion.

The moving leg completes a loop portion of the hanger. The moving leg swings open at a hinge when the weight of the pipe or conduit comes in contact. Once the pipe or conduit settles in the U-shape portion (the receiving saddle), the leg moves closed. The leg makes a connection with the catch arm completing the loop portion of the hanger. Now both sides of the hanger can equally distribute the load of the pipe or conduit.

The final component of the loop hanger is the barrel nut. The barrel nut allows the connection of the hanger to the structure. This also gives the ability to easily make height adjustments of the hanging pipe or conduit.

The pipe-drop-in loop hanger as installed supports the load of the pipe or conduit. The loads associated with the pipe or conduit are carried through both sides of the hanger. The connection of the moving arm to the angled catch arm completes the distribution of the load. The features of the moving arm allow installation of the pipe or conduit to just be dropped into the hanger.

With reference to FIGS. 1-5, a first embodiment hanger 10 is shown. A main body 12 is a loop that contains a U-shape part 14 formed by stamping, which encloses an object to be supported 18, such as a pipe or conduit (in the illustrated embodiment). The main body 12 includes a saddle 20 for supporting the object, a stem 22 and a tip 24 extending from opposite sides of the saddle 20, a top end 26 where the hanger 10 is coupled to the threaded rod, a catch arm 30 that extends outward from the tip 24, and a leg 32. The catch arm 30 catches the pipe or conduit 18, and guides it into the main body 12. The leg 32 is a moving leg that is hingedly coupled to the top end 26. The hinged coupling may include a hinge pin 34 or other suitable device or mechanism. The moving leg 32 swings open by the weight of or a downward force applied to the pipe or conduit 18. The moving leg 32 closes when pipe or conduit 18 rests in the main body 12, on the saddle 20. The force for closing the moving leg 32 may be a spring or other suitable device that provides a bias in the position of the moving leg 32. A connection 36 of the moving leg 32 with the catch arm 30 allows the load to be distributed equally in the hanger 10. In the illustrated embodiment (FIG. 1) the connection 36 is a hook cut from the catch arm 30, which engages a corresponding hole near the distal edge of the leg 32. The hook allows the leg 32 to move toward the stem 22, while restricting movement of the leg 32 in the opposite direction. Alternatively, the connection 36 may be any of a variety of mechanical couplings, preferably being some sort of releasable coupling.

A barrel nut 40 is retained at the top end 26, and allows attachment of the hanger 10 to a threaded rod. The barrel nut 40 also rotates easily allowing height adjustments. The barrel nut 40 may be located in a hole at the top end 26, and may be retained by a flange that is larger than the hole, allowing the barrel nut 40 to rotate freely about its axis. Alternatively, the barrel nut 40 may be loose, rather than positively coupled to the top end 26.

The main parts of the main body 12 (the saddle 20, the stem 22, the tip 24, the top end 26, the catch arm 30, and the leg 32) may have flanges, such as flanges 52 and 54 (FIG. 1), on opposite lateral sides, which form a channel, with the flanges 52 and 54 having respective lips that extend laterally and are used to contact the object 18. The channel shape for the parts helps strengthen the parts, and allows the hook that constitutes part of the connection 36 to be recessed within the channel, avoiding contact between the hook and the object 18.

The saddle 20 may have a curved shape in the circumferential direction of the object 18. In an installed configuration, with the barrel nut 40 engaging a vertical threaded rod, the saddle 20 is centered about an axis or plane (centerline or centerplane) 60 (FIG. 2) of the hanger 10 that follows (is coincident with or contains) the axis of the threaded rod. The top end 26 may be horizontal, may overlie the saddle 20, and may also be centered about the axis or plane 60.

The stem 22 may emerge from saddle 20, at one end 62 of the saddle 20, in a vertical stem portion 64. A bend in the stem 22 marks the division between the vertical stem portion 64 and an inward-angled stem portion 66 that extends to the top end 26. The angle between the stem portions 64 and 66 may be about 150 degrees, or may more broadly be greater than 90 degrees and less than 180 degrees. As an alternative, a more gentle curve may replace the bend between the portions 64 and 66.

The tip 24 may also emerge from the saddle 20 vertically (on an opposite end 68 of the saddle 20 from the stem 22). A straight portion 72 of the tip 24 then transitions through a curved portion 74 to the catch arm 30. The catch arm 30 may be at an angle of about 135 degrees from the straight portion 72. More broadly, the angle between the catch arm 30 and the tip 24 (the tip straight portion 72) may be between 120 and 150 degrees. More broadly, the angle between the catch arm 30 and the tip 24 (the tip straight portion 72) may as such to provide a downward path to guide the device 18 to the saddle 20

The catch arm 30 extends out sufficiently from the centerline or plane 60 of the hanger 10 to be able to engage the device 18 when the device 18 is lowered vertically alongside the hanger 10. To that end the catch arm 30 may extend laterally beyond the tip 24 (the tip straight portion 72), in a direction away from the centerline 60, by at least 100% of a radius of the saddle, by at least 150% of the radius of the saddle by at least 50% of a distance between the ends 62 and 68 of the saddle 20 (the locations where the saddle 20 transitions to the stem 22 and the tip 24), and/or by at least 75% of the distance between the ends 62 and 68 of the saddle 20.

In the illustrated embodiment the saddle 20, the stem 22, the tip 24, the top end 26, and the catch arm 30 are all parts of unitary continuous piece of material. This part may be may constitute a fixed part, fixed to the threaded rod, in contrast to the movable leg 32. The parts of the hanger 10 may be made of steel or another suitable material.

Figure 2:
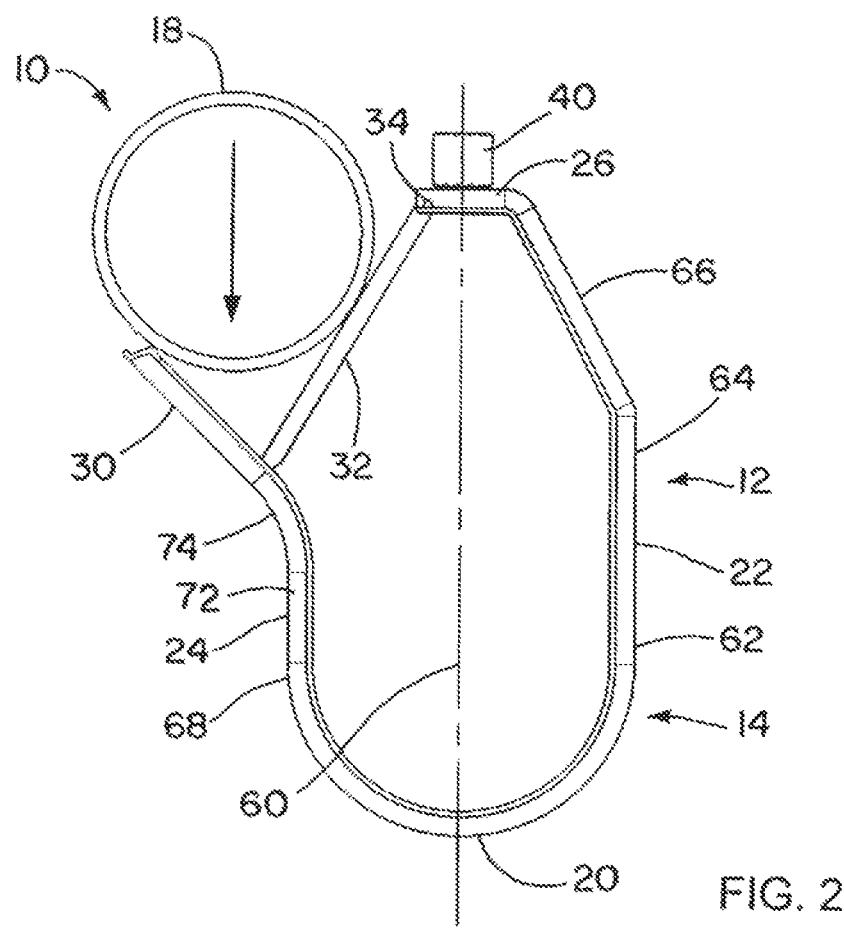
FIG. 2 is an end view of a first step in placing an object in the hanger of FIG. 1.
Figure 3:
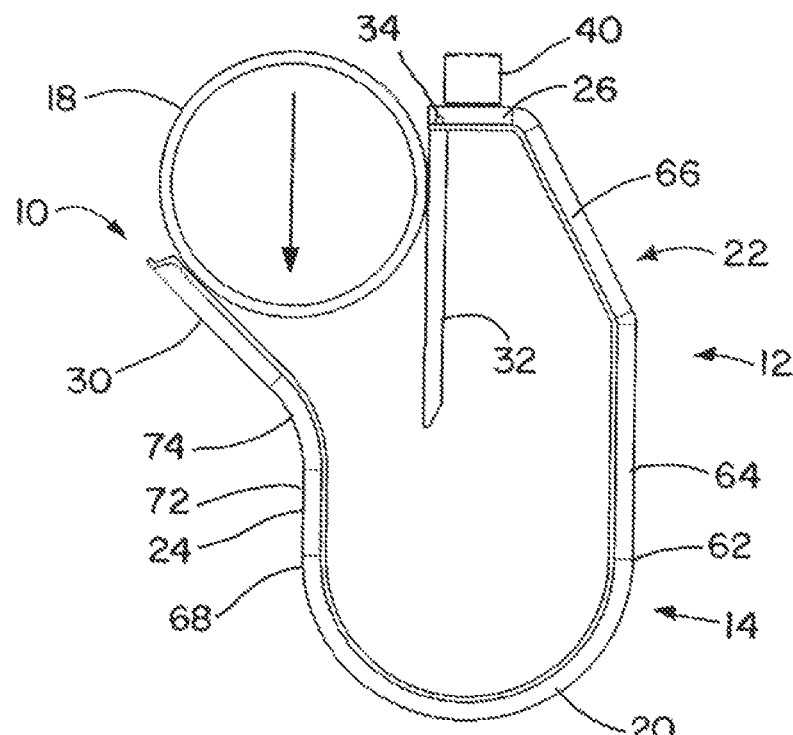
FIG. 3 is an end view of a second step in placing an object in the hanger of FIG. 1.

FIGS. 2-5 show a sequence of the placement of the object 18 into the hanger 10. In FIG. 2 the object 18 is being lowered vertically, and has first come into contact with the catch arm 30. FIG. 3 shows the object 18 pushing the leg 32 out of the way as it moves along the catch arm 30 toward the interior of the hanger 10. The catch arm 30 converts the downward movement of the object 18 into movement that is both downward and toward the centerline 60 of the hanger 10.

Figure 4:
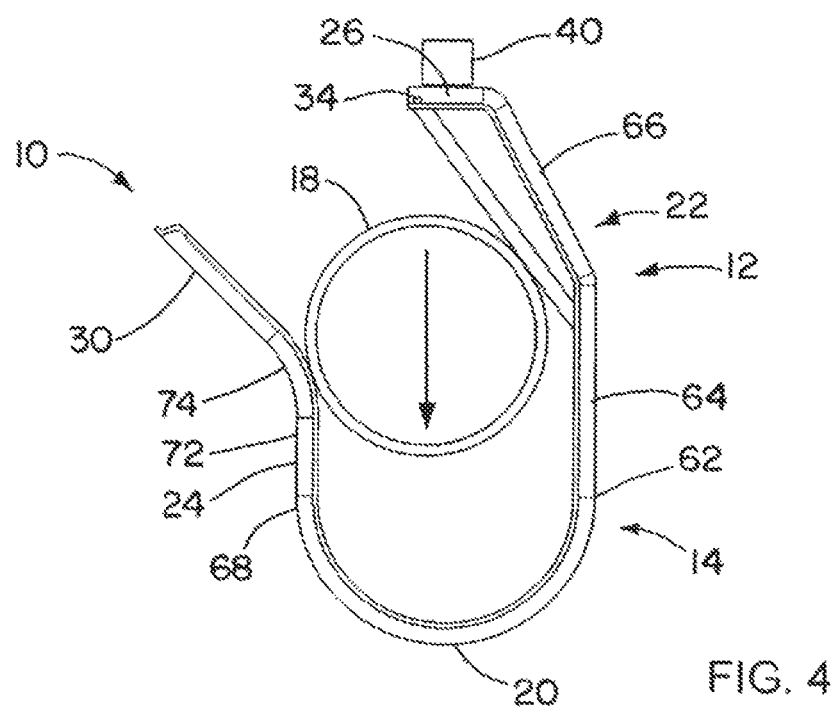
FIG. 4 is an end view of a third step in placing an object in the hanger of FIG. 1.
Figure 5:
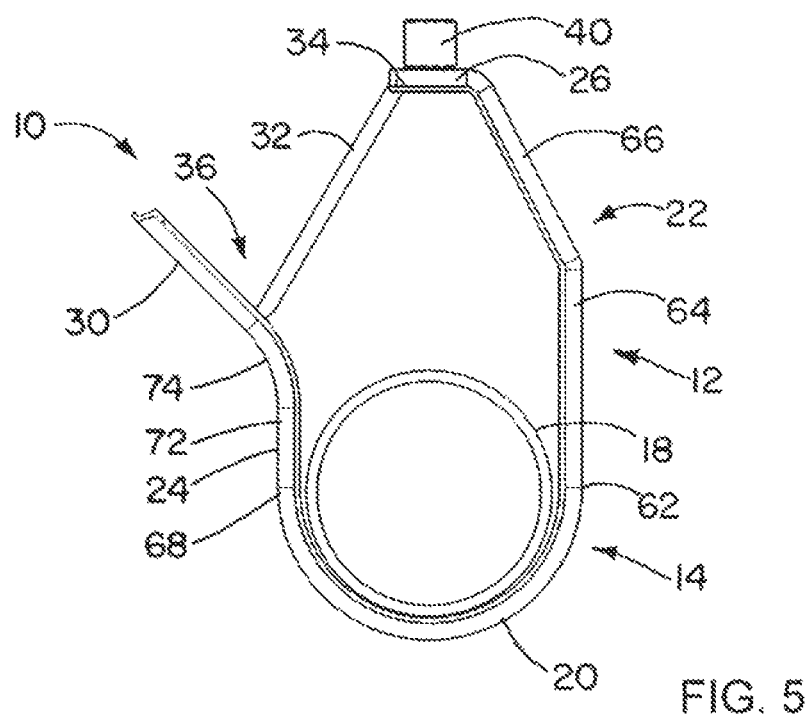
FIG. 5 is an end view of a fourth step in placing an object in the hanger of FIG. 1.

FIG. 4 shows the object 18 entering into the interior of the hanger 10, having gotten clear of the catch arm 30. The leg 32 is pushed out of the way, with its free end being pushed close to (or in contact with) the vertical stem portion 64. Finally, in FIG. 5, the object 18 reaches its final position in the saddle 20. The leg 32 has moved back into engagement with the catch arm 30, closing off the object 18 within the hanger 10 and providing a load path through the leg 32 and the tip 24.

The hanger 10 provides advantages for installation of a pipe or conduit 18 over stabbing the pipe or conduit (sliding the pipe or conduit into a series of already-installed hangers). Using the hanger 10 described above, all threaded rods and hangers can be in their final installed locations prior to easy installation of the pipes or conduits. This would add in the ability to build more assemblies on the ground. Take fire sprinkler pipe for instance: The sprinkler lines can be built completely on the ground. Sprinkler heads, branches, pipe connections, etc. can all be made on the ground. Then the entire assembly can be picked up and dropped into the hanger. The prior art method of installation by stabbing the pipe would make this impossible. Sprinkler heads, branches, pipe connections, etc. will not fit through a hanger. Consider a standard 6.4-meter (21-foot) piece of Schedule 40 Sprinkler Pipe. The prior art installation method would involve stabbing the section through several hangers. The hanger 10 described above allows the same section to just be simply dropped into the hangers.

Another advantage over prior devices/methods is that with all hangers in their final installed location, no disassembly of hardware is needed. Prior systems require that all parts be disassembled, the loop or U-form body of the hanger be fed around the pipe/conduit, and all loose hardware be reassembled. For the pipe-drop-in loop hanger the pipe or conduit drops into the hanger. The final installed location and hangers are not disturbed.

Many alternatives are possible. For example, the stem may have a different configuration, coupling together the saddle and the top end, while still allowing sufficient travel of the leg. As another example, the catch arm may have a different shape, for example having a shape that is curved over more of its length. As another possible alternative, the hanger 10 may be modified by removing the moving leg 32 and associated hinge connection.

As another alternative, the hanger 10 may be configured to be coupled to object other than a threaded rod, for example having a clamp for clamping to a beam or other object. The threaded rod coupling in the hanger 10 is only one example of a broad range of mechanical couplings that alternative embodiments may have for coupling a hanger to another object, which may or may not be a part of or coupled to building structure.

In an alternative configuration the pipe-drop-in loop hanger can be more of a J-hook hanger that is supported by a threaded rod by moving the pinned connection to the opposite leg. The alternative configuration is made up three different components: a barrel nut, a fixed angled catch arm, and a moving body that consists of a J-Hook portion.

The main body is a stamped J hook that moves as a service pipe or conduit is dropped into the hanger. The J-portion of the loop captures the pipe on the bottom and both sides. The moving body completes the loop portion of the hanger. This moving body swings when the weight of the pipe or conduit comes in contact. Once the pipe or conduit settles in the "J" portion, the body moves closed. The J-shape body makes a connection with the angled catch arm completing the loop portion of the hanger. Now both sides of the hanger can equally distribute the load of the pipe or conduit. The preferred method of creating the "J" shaped component is stamping. Other possible manufacturing processes are casting, forging, or machining.

The hanger has an angled catch arm. The angled catch arm catches the pipe or conduit guiding the part into the J-shape portion.

The final component of the alternate embodiment hanger is the barrel nut. The barrel nut allows the connection of the hanger to the structure. This also gives the ability to easily make height adjustments of the hanging pipe or conduit.

The alternate embodiment hanger as installed supports the load of the pipe or conduit. The loads associated with the pipe or conduit are carried through both sides of the hanger do to the connection of the moving arm connection to the catch arm. The features of the moving arm allow installation of the pipe or conduit to just be dropped into the hanger.

FIGS. 6-11 show the alternate embodiment pipe hanger 110. The shape and details of many parts of the hanger 110 are similar to those of the hanger 10 (FIG. 1), with description of many similar features omitted in the description below. A main body 112 of the hanger 110 is a J hook or loop that contains a J-shaped formed by stamping, which wraps around a pipe or conduit 118. The main body 112 includes a saddle 120, a tip 122 at one end of the saddle 120 (with a straight portion and an outwardly-curved portion), and a stem 124 at the other end of the saddle (with a vertical portion and an angled portion, the latter of which is hingedly connected to a top end 126). The vertical portion of the stem 124 has a rectangular window or cutout 138 therein. The main body 112 is a moving body portion that swings by the weight of the pipe or conduit 118, as the pipe or conduit is inserted 118, as shown in the installation process depicted in FIGS. 7-11. The moving main body 112 closes when pipe or conduit 118 rests in the saddle 120. A connection 136 of the moving body 112 with the catch arm 130 allows the load to be distributed equally in the hanger 110. The catch arm 130 catches the pipe or conduit 118 and guides into the body 112, and ultimately to the saddle 120. A barrel nut 140 (or other threaded rod coupling) is retained at the top end 126, and allows attachment to the threaded rod. The barrel nut 140 also rotates easily allowing height adjustments. The top end 126 and the catch arm 130 together constitute a fixed portion of the hanger 110, fixed in that it is fixed with respect to the threaded rod.

Figure 6:
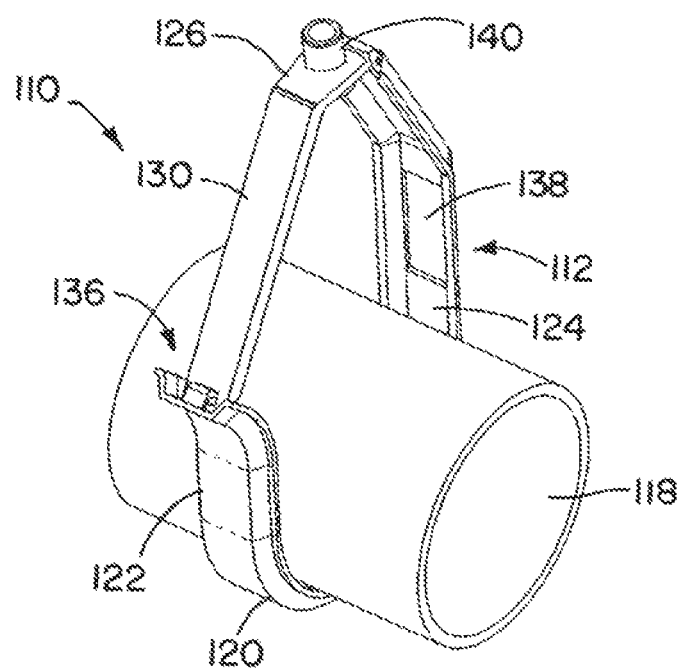
FIG. 6 is an oblique view of a hanger in accordance with an alternate embodiment of the present invention.
Figure 7:
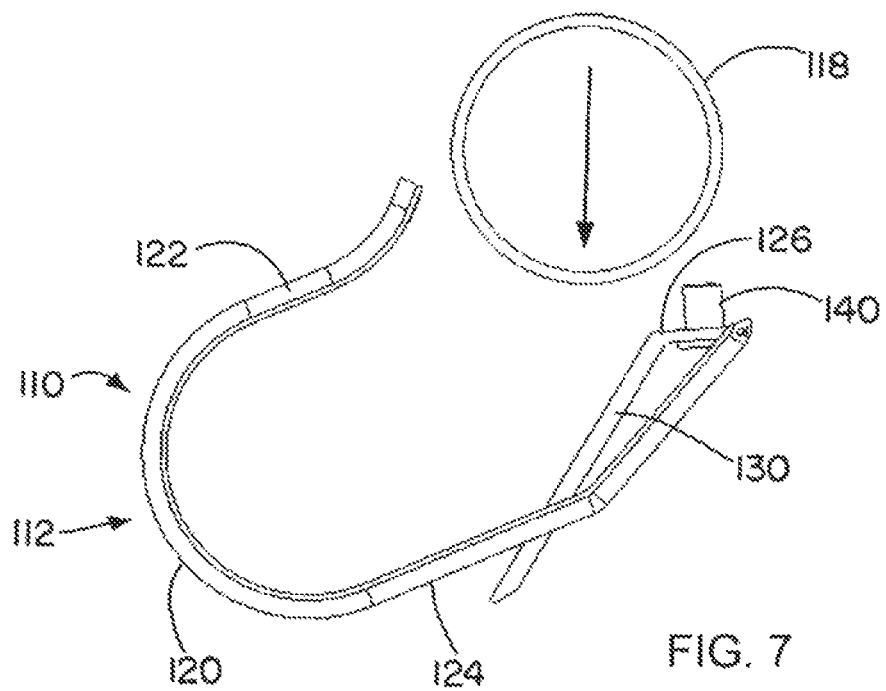
FIG. 7 is an end view of a first step in placing an object in the hanger of FIG. 6.
Figure 8:
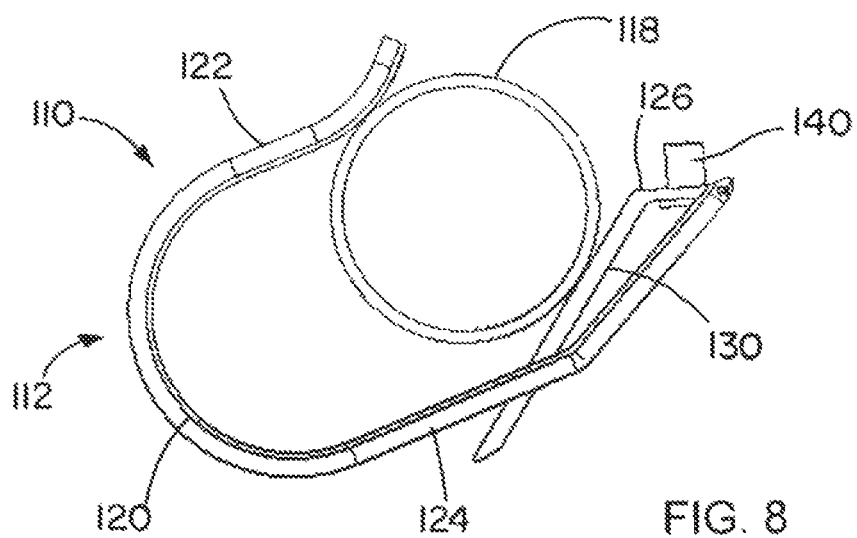
FIG. 8 is an end view of a second step in placing an object in the hanger of FIG. 6.
Figure 9:
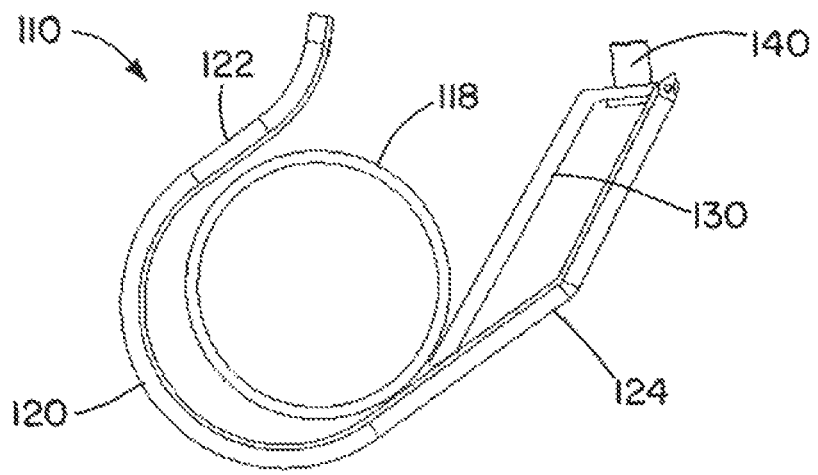
FIG. 9 is an end view of a third step in placing an object in the hanger of FIG. 6.
Figure 10:
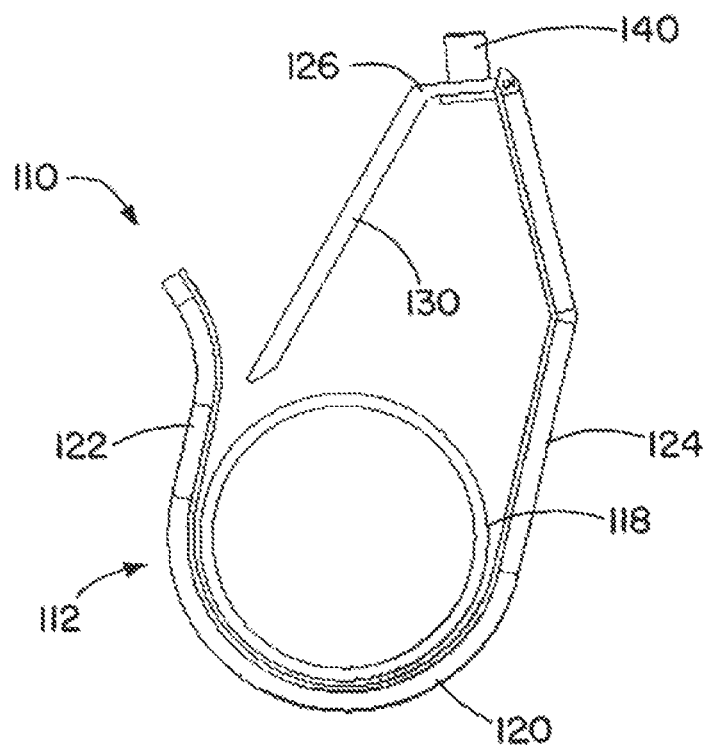
FIG. 10 is an end view of a fourth step in placing an object in the hanger of FIG. 6.
Figure 11:
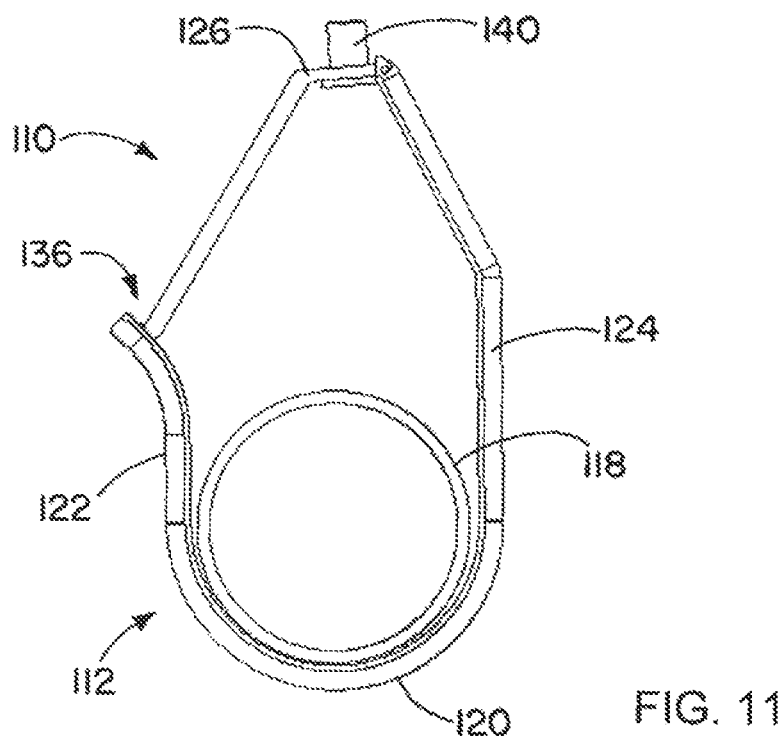
FIG. 11 is an end view of a fifth step in placing an object in the hanger of FIG. 6.

FIGS. 7-11 show the process of the securing the object 118 within the hanger 110. The object 118 is lowered vertically, off to one side of the top end 126 (and the threaded rod), as shown in FIG. 7. The main body 112 is positioned beneath the object 118, which necessitates having the catch arm 130 enter the window or cutout 138 (FIG. 6). The object 118 makes contact with the catch arm 130, which directs it outward toward the saddle 120, as shown in FIGS. 8 and 9. As shown in FIG. 10, then the object settles into the saddle 120, and (with reference to FIG. 11) the main body 112 is moved back to place the saddle 120 under the top end 126, and to engage the connection 136 (engaging a hook on the curved portion of the tip 122 with an opening in the catch arm 130, for example). As with the hanger 10 (FIG. 1), the load in the hanger 110 advantageously passes through paths on both sides of the object 118.

FIGS. 12-16 show an alternate embodiment pipe hanger 210 that restrains the upward vertical movement of the object 218 after installation. The shape and details of many parts of the hanger 210 are similar to those of the hanger 10 (FIG. 1), with description of many similar features omitted in the description below show a sequence of the placement of the object 218 into the hanger 210. The hanger has a catch arm 230 for receiving the object 218 and directing the object 218 into the interior of the hanger 210, toward a saddle 220 in which the object 218 can rest. A tip 222 is located between the saddle 220 and the catch arm 230. A moving leg 232 is hingedly connected to a top end 226 of the hanger 210. The saddle 220, the tip 222, a stem 224, the top end 226, and the catch arm 230 are all parts of main body 212 of the hanger 210.

The leg 232 has a body 270 that is a coupled to the top end 226, and arms or tabs 272 and 274 that make an angle, such as a right angle, with the body, and extend away from the body 270. The arms 272 and 274 may be parallel to one another, extending from opposite sides of the bottom of the body 270. The arms 272 and 274 have respective proximal portions 276 and 278, and respective distal free ends 280 and 282. At a lower end of the body 270, at an outer surface of the body 270 (facing away from a centerline 260 of the hanger 210), the body 270 has a notch 290 which engages an edge or other inside part of the catch arm 230. The proximal arm portions 276 and 278 each may have a curved surface 296 on a bottom of the arm portions 276 and 278, curved toward and facing the saddle 220. The distal free ends 280 and 282 may be angled up from the proximal portions 276 and 278, angling toward the top end 226. The distal free ends 280 and 282 may pass through a suitable opening or openings, such as cutout windows, in the stem 224.

Figure 13:
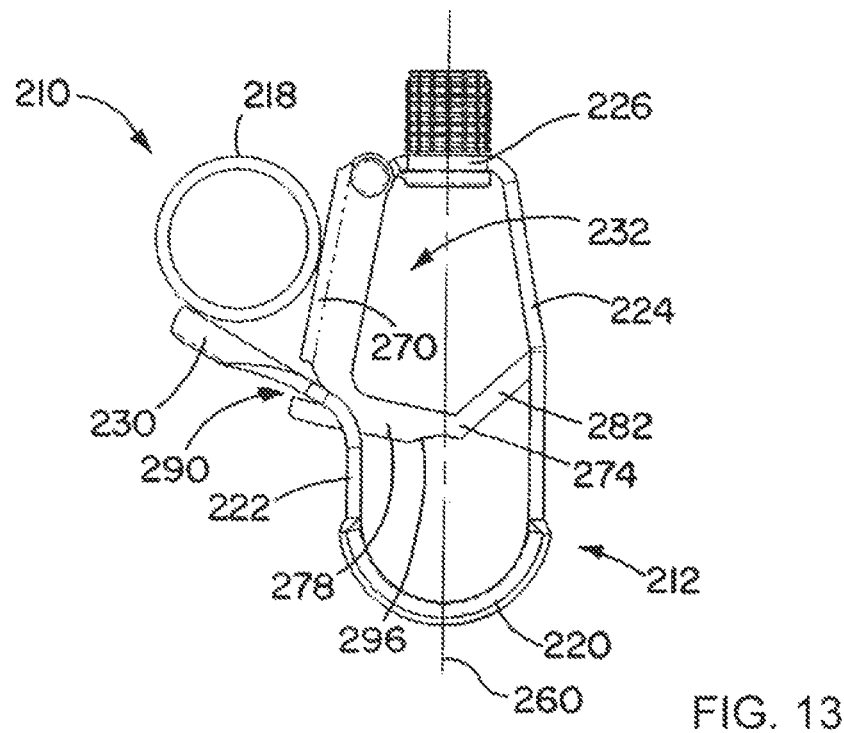
FIG. 13 an end view of a first step in placing an object in the hanger of FIG. 12.
Figure 14:
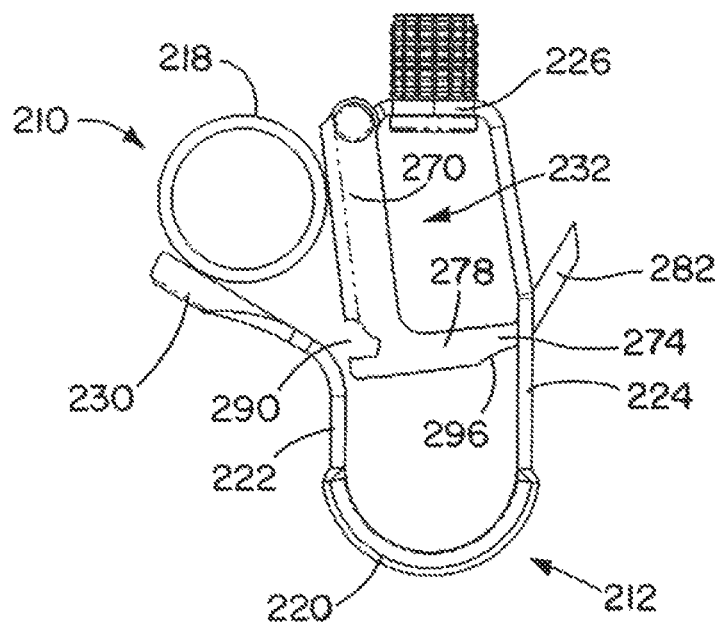
FIG. 14 an end view of a second step in placing an object in the hanger of FIG. 12.
Figure 15:
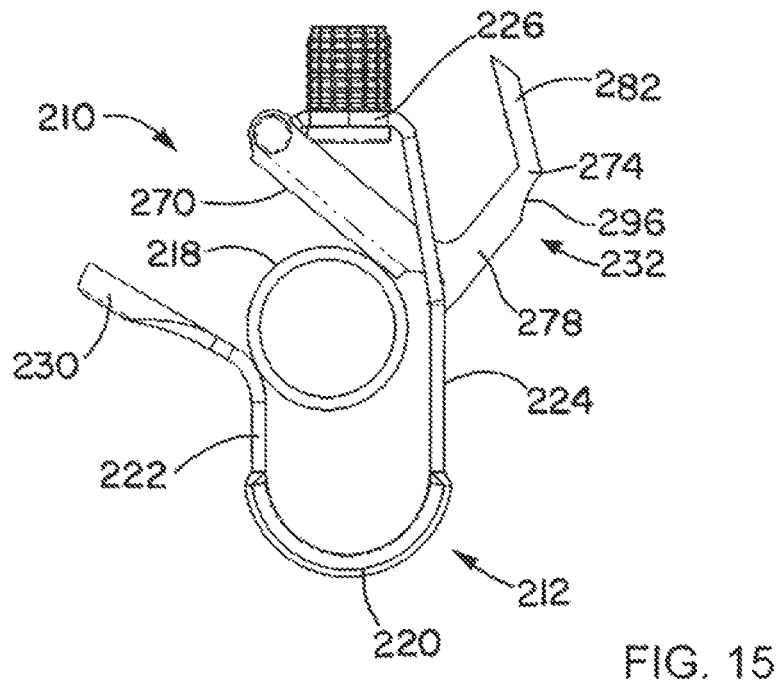
FIG. 15 an end view of a third step in placing an object in the hanger of FIG. 12.
Figure 16:
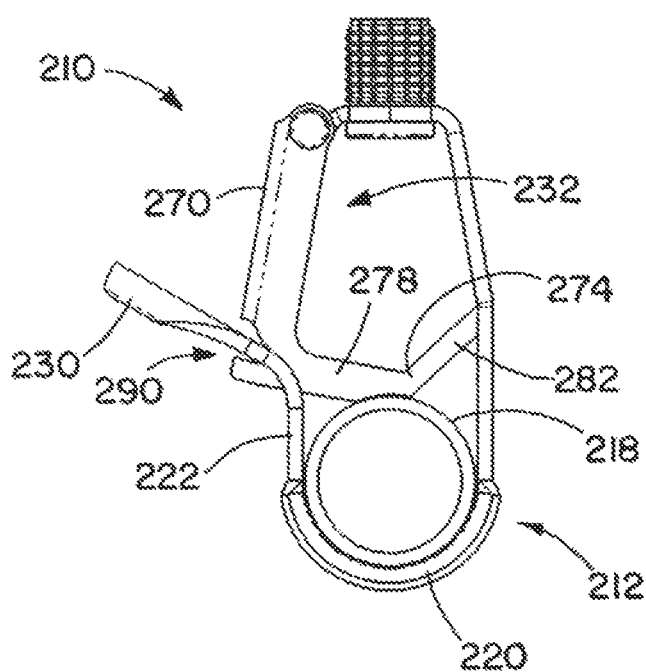
FIG. 16 an end view of a fourth step in placing an object in the hanger of FIG. 12.

In FIG. 13 the object 218 is being lowered vertically, and has first come into contact with the angled catch arm 230. FIG. 14 shows the object 218 pushing the leg 232 out of the way as it moves along the catch arm 230 toward the interior of the hanger 210. As the leg 232 is pushed out of the way, the vertical restraining tabs 272 and 274 on the leg 232 pass through cutout windows in the back side of the hanger 210. The catch arm 230 converts the downward movement of the object 218 into movement that is both downward and toward the centerline 260 of the hanger 210. FIG. 15 shows the object 218 entering into the interior of the hanger 210, having gotten clear of the catch arm 230. The leg 232 is pushed out of the way. Finally, in FIG. 16, the object 218 reaches its final position in the saddle 220. The leg 232 has moved back into engagement with the catch arm 230, with part of the catch arm 230 entering into and engaging the notch 290. This closes off the object 218 within the hanger 210 and providing a load path through the leg 232 and the tip 222, in addition to the load path through the stem 224. The vertical restraining tabs on the leg now reside over the object 218, now preventing upward vertical movement of the object 218. The surfaces 296 may be in contact against the object 218, with any upward force by the object 218 against the surfaces 296 being transmitted through both the body 270 of the leg 232, and through the stem 224 (by contact between the arms or tabs 272 and 274 and the stem 224).

Figure 17:
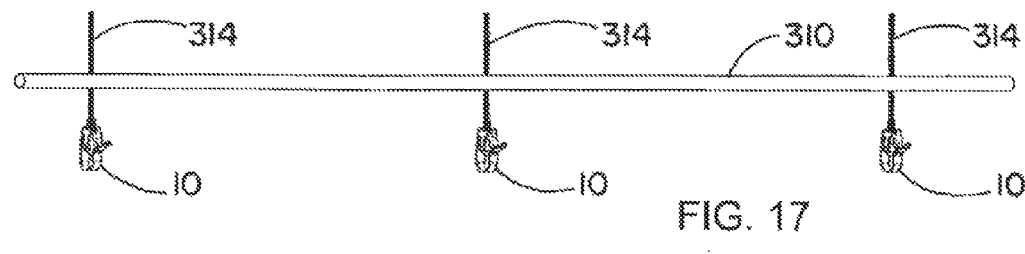
FIG. 17 is an oblique view showing a first step in installation of a horizontal pipe run in a series of hangers, according to an embodiment of the invention.
Figure 18:
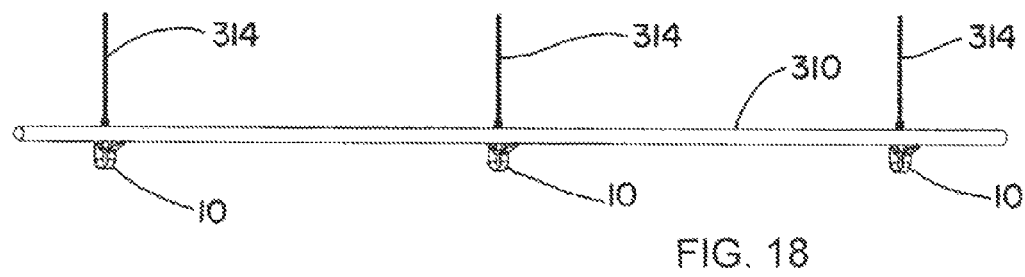
FIG. 18 is an oblique view showing a second step in the installation of the horizontal pipe run.
Figure 19:
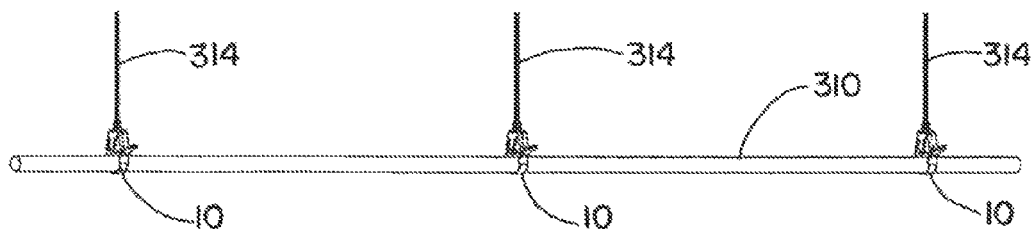
FIG. 19 is an oblique view showing a third step in the installation of the horizontal pipe run.
Figure 20:
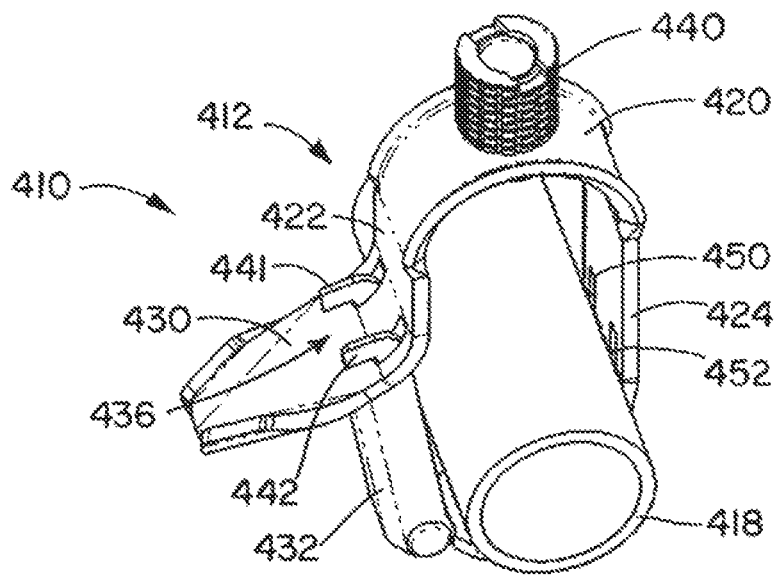
FIG. 20 is an oblique view of an alternative design of the hanger in accordance with yet another alternate embodiment of the present invention.
Figure 21:
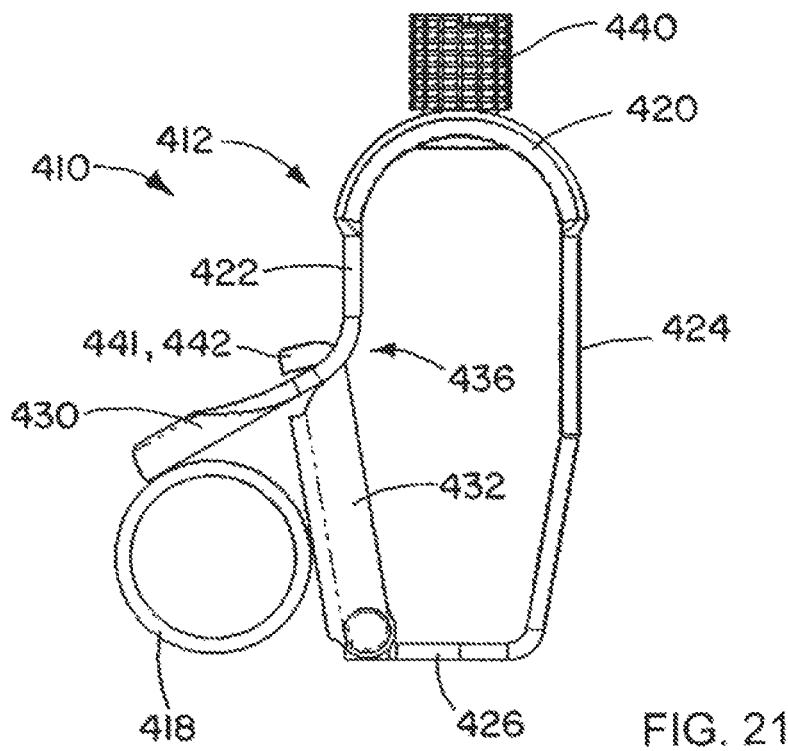
FIG. 21 an end view of a first step in placing an object in the hanger of FIG. 20.

FIGS. 17-19 show installation of a horizontal pipe run 310 into a series of the hangers 10 that are supported on a series of threaded rods 314. FIG. 17 shows the pipe run 310 above the hangers 10. FIG. 18 shows the pipe run 310 lowered onto the catch arms of the hangers 10. The pipe run 310 is directed into the hangers 10, where it settles into the saddles of the hangers 10, as shown in FIG. 19. It will be appreciated that any of the other hanger embodiments disclosed herein may be substituted for the hangers 10 shown in FIGS. 17-19.

Figure 12:
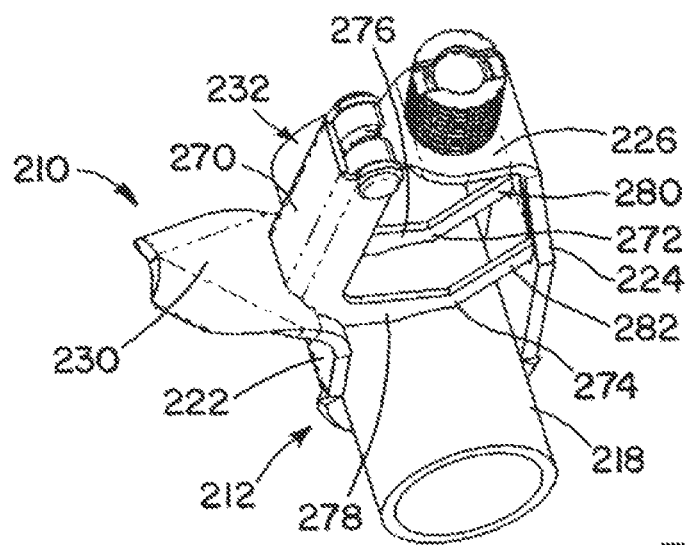
FIG. 12 is an oblique view of an alternative design of the hanger in accordance with another alternate embodiment of the present invention.

FIG. 20-25 show another alternative embodiment hanger, a hanger 410 that in some ways is an inverted version of the hanger 210 (FIG. 12). The hanger 410 has a main body (fixed portion) 412 and a moving leg (moving or moveable portion) 432 that is hinged to move relative to the main body 412. The hanger 410 holds an object 418 by passing it into an interior of the hanger 410 by pushing aside the moving leg 432, which is biased toward the closed position shown in FIGS. 20, 21, 24, and 25. The main body 412 has a curved top portion 420, a tip 422 and a stem 424 on opposite respective ends of the curved portion 420, a catch arm 430 extending outwardly from the tip 422, and a bottom end 426 bent horizontally from the stem 424. A threaded rod coupling 440, such as a barrel nut, may be located at the top portion 420. The leg 432 is hingedly coupled to the bottom end 426. The leg 432 has a pair of hooks 441 and 442 that engage corresponding openings or windows 444 and 446 at the transition between the tip 422 and the catch arm 430, to form a connection 436. The stem 424 has a pair of cutouts or windows 450 and 452 to allow entry of back ends of the hooks 441 and 442 during movement of the leg 432 to admit the object 418 into the hanger 410.

Figure 22:
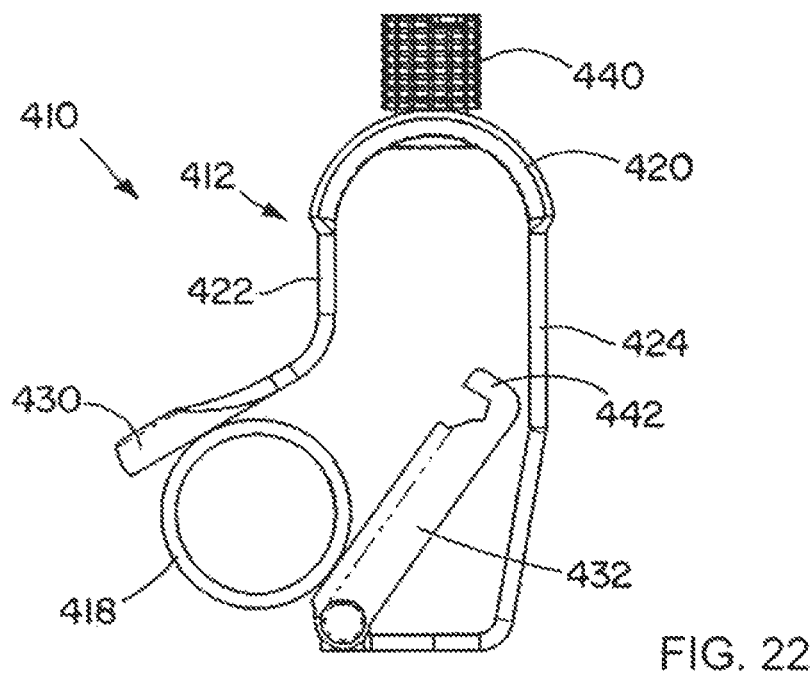
FIG. 22 an end view of a second step in placing an object in the hanger of FIG. 20.
Figure 23:
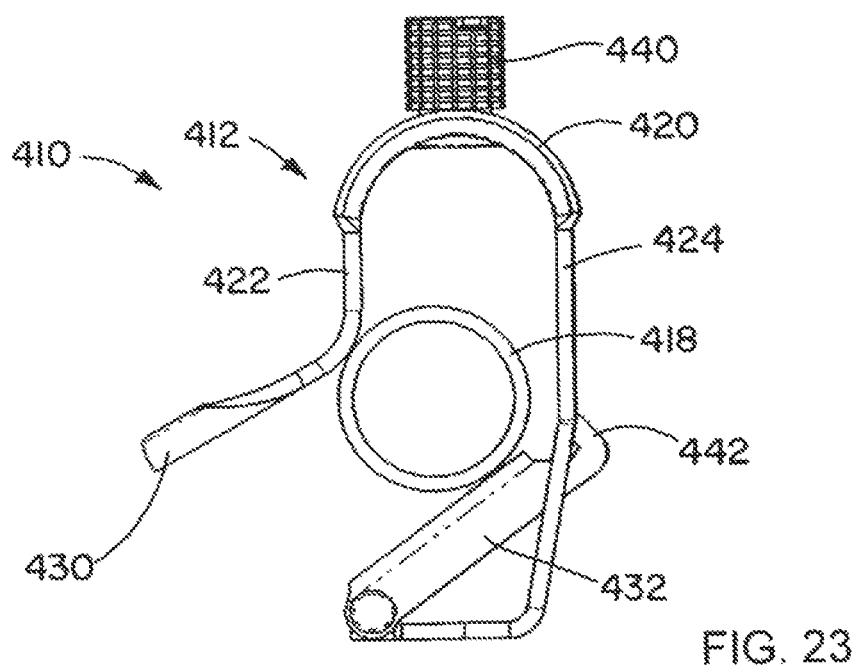
FIG. 23 an end view of a third step in placing an object in the hanger of FIG. 20.
Figure 24:
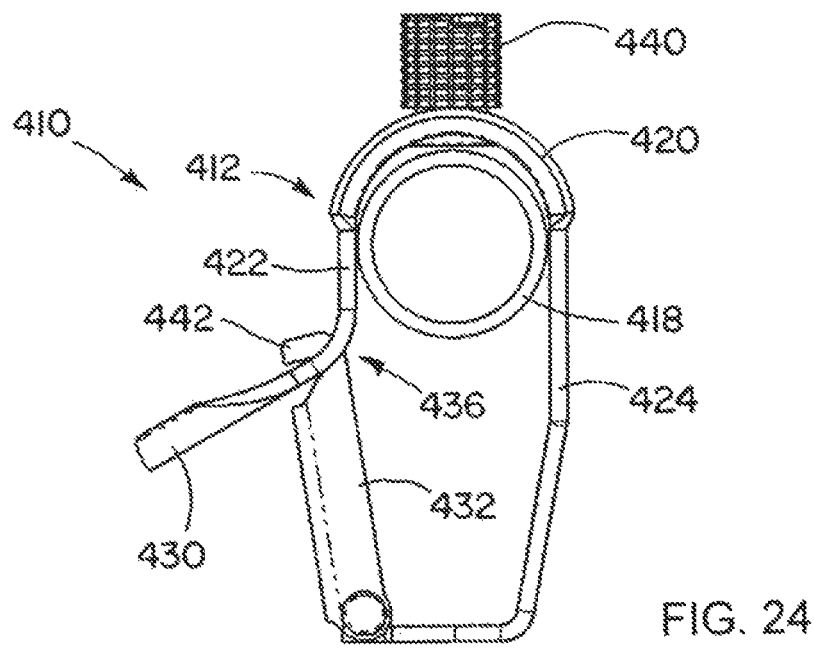
FIG. 24 an end view of a fourth step in placing an object in the hanger of FIG. 20.
Figure 25:
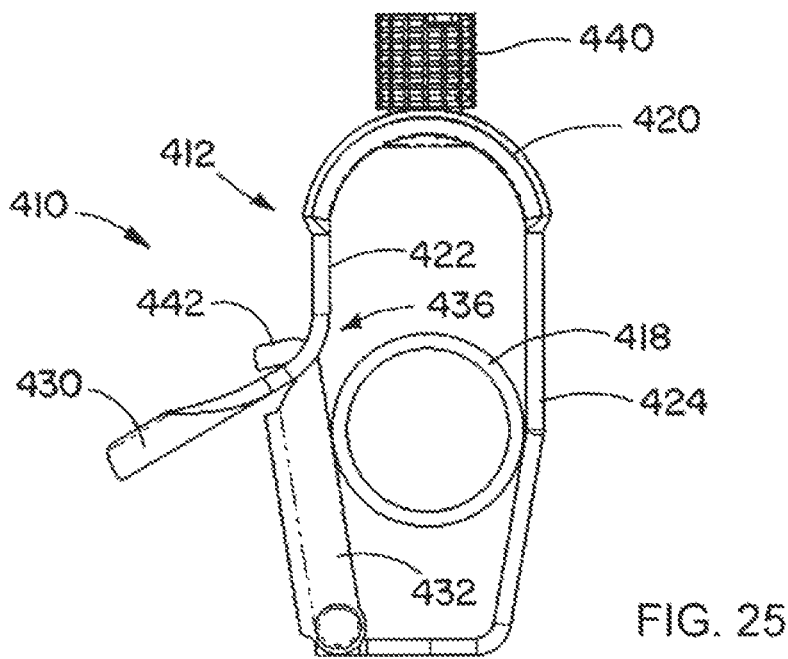
FIG. 25 an end view of a fifth step in placing an object in the hanger of FIG. 20.

The process of placement of the object 418 into the hanger 410 is shown in FIGS. 21-25. First the object 418 is movement upward to engage the catch arm 430 (FIG. 21), which urges the object 418 to move upward and inward toward the interior of the hanger 410. This upward and inward movement of the object 418 pushes aside the leg 432 to allow entry of the object 418 (FIGS. 22 and 23). As shown in FIG. 23, the hooks 441 and 442 pass into the stem windows 450 and 452 (FIG. 20) in the stem 424. Once in the interior of the hanger 410, the object 418 may be raised (moved toward the curved top portion 420), to allow the leg 432 to move back into engagement with the main body 412, with the hooks 441 and 442 once again becoming connected with the main body 412, as shown in FIG. 24. Then the object 418 may be lowered, as shown in FIG. 25, with the object 418 supported by contact with both the leg 432 and the stem 424. The object 418 is supported by load paths on both sides of the hanger 410, with one path being through the stem 424, and the other path being through the leg 432 and the tip 422.

FIGS. 26-31 show another variant, a hanger 510 which is similar to the hanger 410 (FIG. 20), except that a moving leg 532 of the hanger 510 has a pair of curved extensions 560 and 562 that support an object 518 after installation of the object 518 into the hanger 510. The curved extensions 560 and 562 constitute a saddle 564 that supports the installed object 518. Other parts of the hanger 510 are similar to those of the hanger 410, with a main body 512 having a curved top portion 520, a tip 522, a stem 524, an end 526, and a catch arm 530, and with the leg 532 having a pair of hooks 541 and 542 that engage openings or windows 544 and 546 in the main body 512, to form a connection 536. The extensions 560 and 562 may be co-planar with the respective hooks 541 and 542 A threaded rod connection 540, such as a barrel nut, may pass through an opening in the middle of the top portion 520. One difference about the main body 512 is that it has cutouts or windows 550 and 552 that extend along parts of both the stem 524 and the end 526, to allow passage of the curved extension 560 and 562 during installation of the objection 518 into the hanger 510.

Figure 26:
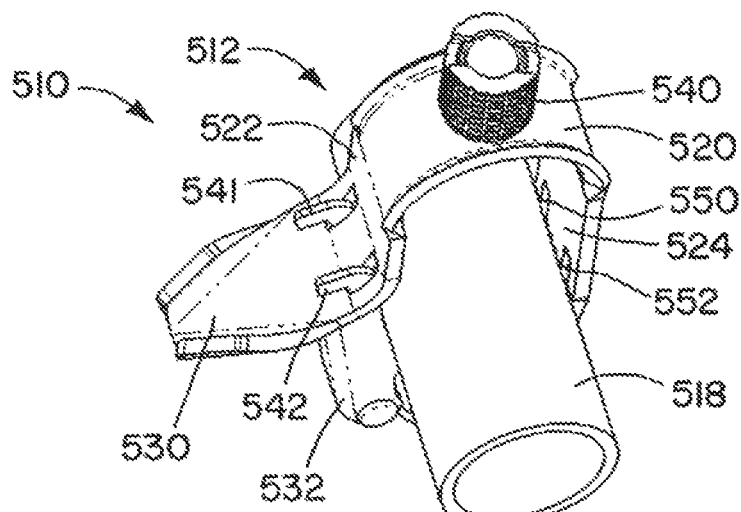
FIG. 26 is an oblique view of an alternative design of the hanger in accordance with another alternate embodiment of the present invention.
Figure 27:
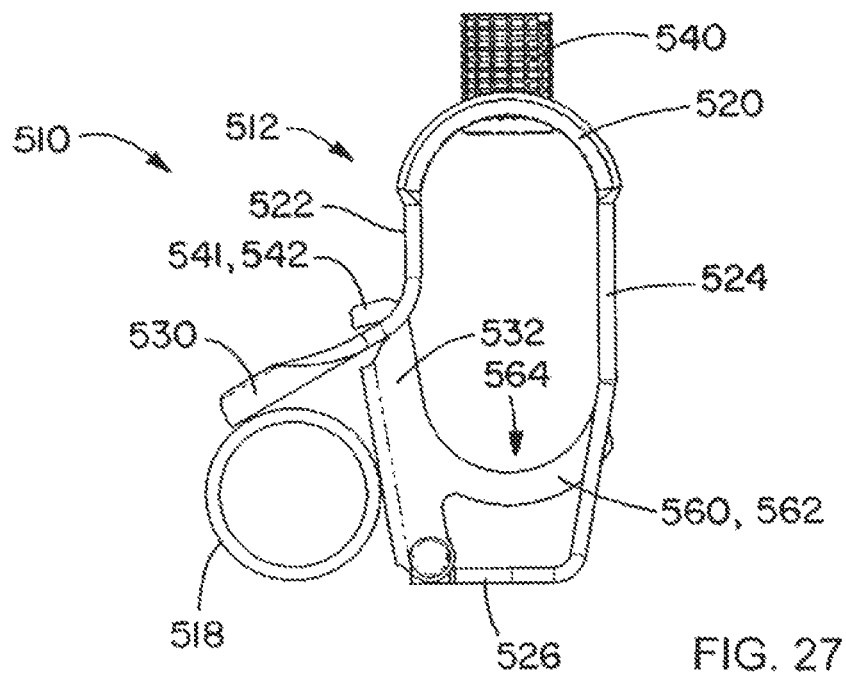
FIG. 27 an end view of a first step in placing an object in the hanger of FIG. 26.
Figure 28:
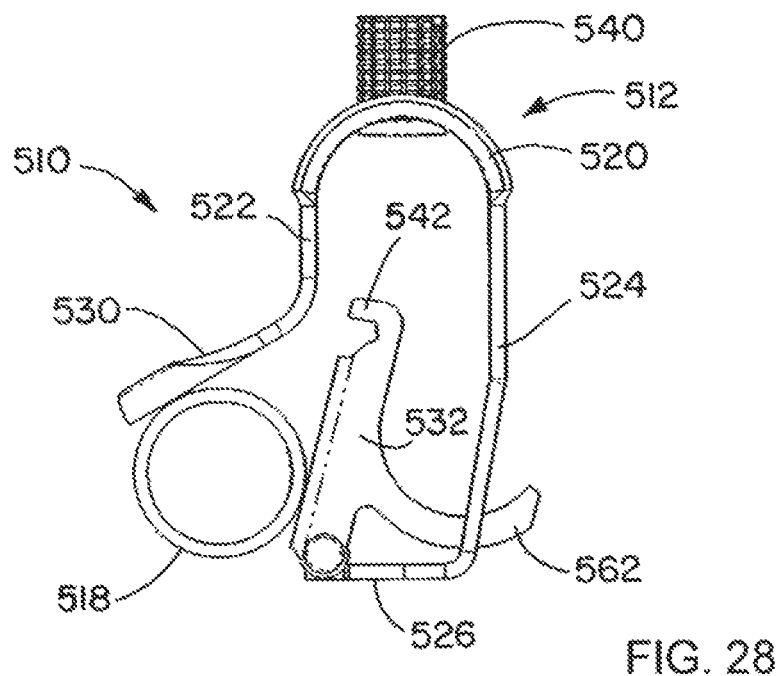
FIG. 28 an end view of a second step in placing an object in the hanger of FIG. 26.
Figure 29:
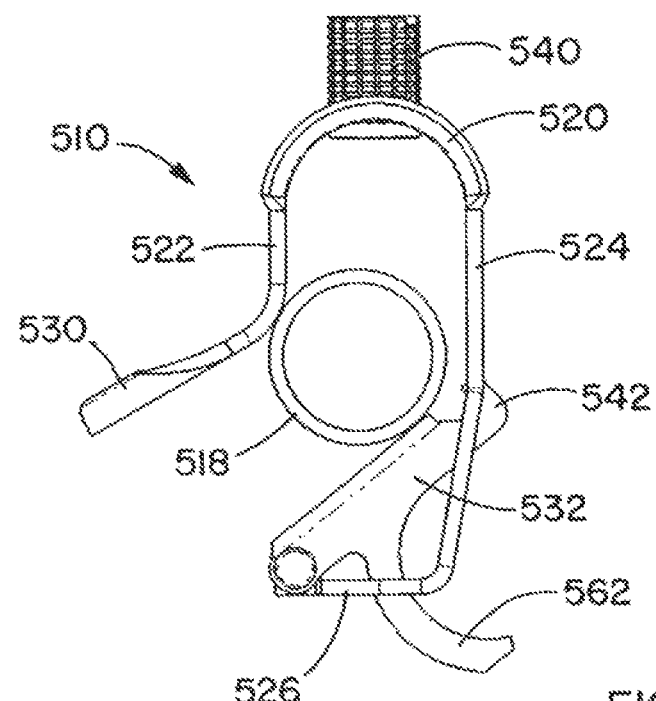
FIG. 29 an end view of a third step in placing an object in the hanger of FIG. 26.
Figure 30:
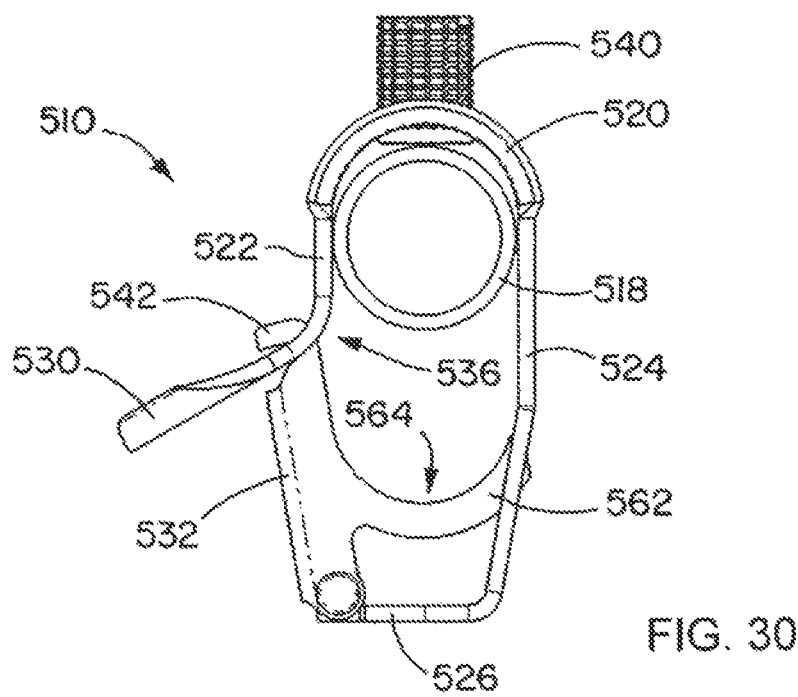
FIG. 30 an end view of a fourth step in placing an object in the hanger of FIG. 26.
Figure 31:
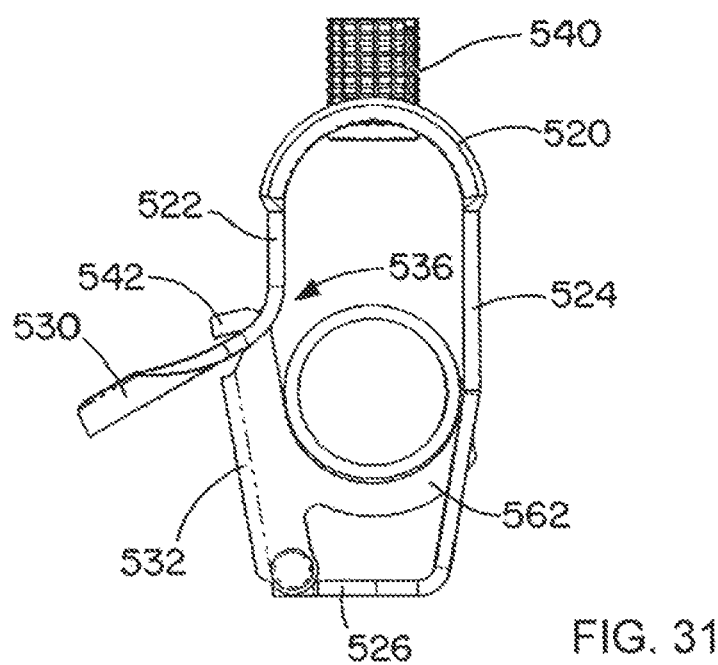
FIG. 31 an end view of a fifth step in placing an object in the hanger of FIG. 26.

FIGS. 27-31 show steps in the installation process. The object 518 engages the catch arm 530, as shown in FIG. 27. The further movement of the object 518 along the catch arm 530 pushes the catch arm 530 inward to allow ingress of the object 518 into the interior of the hanger 510, as shown in FIGS. 28 and 29. During this process the hooks 541 and 542 and the curved extensions 560 and 562 both pass into the cutouts or windows 550 and 552 (FIG. 26). Then the object 518 is moved upward to allow the leg 532 to move back and close the connection 536 (FIG. 30), and the object 518 is then brought down to rest on the curved extensions 560 and 562, and on the stem 524. Load paths are maintained through the hanger 510, along both sides of the object 518.

Many alternatives for the hangers 410 and 510 are possible. The top portions 420 and 520 need not be curved, but instead may be made of any of a variety of other shapes, for example a series of angled straight segments.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A hanger to support an object, the hanger comprising:
   a rod coupling at a top end of the hanger;
   a saddle coupled to the rod coupling, the saddle extending from a first end of the saddle to a second end of the saddle, the second end coupled to the rod coupling, and the saddle at least partially defining an interior area of the hanger;
   a catch arm that guides the object into the saddle as the object is moved relative to the hanger, the catch arm being closer to the first end of the saddle than to the second end of the saddle; and
   a leg that is movable relative to the catch arm to selectively admit the object to be supported, the leg being hinged at a connection with the top end of the hanger and an opposing distal end of the leg pivots into the interior area of the hanger, and closing automatically to a closed position once the object is in the hanger;
   at least one of the leg and the catch arm including a hook;
   the hook on the at least one of the leg and the catch arm contacting another of the at least one of the leg and the catch arm when the leg is in the closed position.

2. The hanger of claim 1, further comprising:
   a tip between the saddle and the catch arm; and
   a stem between the saddle and the top end.

3. The hanger of claim 2, wherein the stem includes:
   a vertical stem portion; and
   an angled stem portion that extends from the vertical stem portion inward toward a centerline of the hanger, to the top end.

4. The hanger of claim 2, wherein the tip is vertical.

5. The hanger of claim 1, wherein the top end is horizontal.

6. The hanger of claim 1, wherein the top end is centered over a center of the saddle.

7. The hanger of claim 1, wherein the saddle is curved so as to accommodate a circular object as the object to be supported.

8. The hanger of claim 1, wherein a centerline of the hanger extends between a center of the saddle and the rod coupling; and
   wherein the catch arm extends laterally beyond the first end of the saddle by at least 50% of a linear distance between the first end of the saddle and the second end of the saddle.

9. The hanger of claim 1, further comprising:
   a tip between the saddle and the catch arm; and
   a stem between the saddle and the top end;
   wherein the catch arm, the tip, the stem, and the saddle are all parts of a single continuous, unitary piece of material.

10. The hanger of claim 1, wherein the rod coupling includes a barrel nut that is configured to threadedly couple to a threaded rod.

11. The hanger of claim 1,
   further comprising a tip between the saddle and the catch arm;
   wherein there is an angle between the tip and the catch arm of between 120 and 150 degrees.

12. The hanger of claim 1,
   wherein the saddle has a circular surface for receiving the object, with the circular surface having a radius; and
   wherein the catch arm extends beyond the saddle, in a direction away from a centerline of the hanger that is between a center of the saddle and the rod coupling, by at least 100% of the radius.

13. A hanger to support an object relative to a structure, the hanger comprising:
a fixed portion at least partly defining a fixed-portion interior area;
a top portion to connect the hanger to the structure; and
a moving portion that pivots at a top end of the moving portion to move an opposing distal end of the moving portion into the fixed-portion interior area to admit the object into the hanger from a lateral side of the hanger;
the fixed portion including a catch arm that extends laterally beyond the moving portion to guide the object into the fixed-portion interior area;
the moving portion being biased to return to a closed position after the object is admitted into the hanger; and
the moving portion and the fixed portion together providing a load path to support the object against gravity when the object is admitted into the hanger and the moving portion is in the closed position, the load path extending from the fixed portion through the moving portion to the top portion.

14. The hanger of claim 2,
further comprising a curved portion between the tip and the catch arm;
wherein a combined distance along the curved portion and the catch arm is at least 50% of a linear distance between the first end of the saddle and the second end of the saddle.

15. The hanger of claim 7,
wherein the saddle is a semicircular saddle.

16. A hanger to support an object, the hanger comprising:
a rod coupling at a top end of the hanger;
a semicircular saddle to receive the object to be supported by the hanger, the semicircular saddle being mechanically coupled to the rod coupling and extending from a first end of the semicircular saddle to a second end of the semicircular saddle, and the semicircular saddle at least partially defining an interior area of the hanger;
a catch arm that guides the object into the saddle as the object is moved relative to the hanger;
a curved portion between the semicircular saddle and the catch arm;
a leg that is movable relative to the catch arm to selectively admit the object, the leg being hinged at a connection with the top end and an opposing distal end of the leg pivots into the interior area of the hanger, and closing automatically to a closed position, once the object is in the hanger; and
a stem between the second end of the semicircular saddle and the top end;
the stem including:
a vertical stem portion; and
an angled stem portion that extends from the vertical stem portion inward toward a centerline of the hanger to the top end;
the top end being horizontal and centered over a center of the semicircular saddle; and
the leg being mechanically coupled to the catch arm, when the leg is in the closed position, to provide a load path to support the saddle against gravity, the load path extending from the semicircular saddle to the rod coupling via the leg.

* * * * *